US011809820B2

(12) United States Patent
Saito et al.

(10) Patent No.: US 11,809,820 B2
(45) Date of Patent: Nov. 7, 2023

(54) LANGUAGE CHARACTERISTIC EXTRACTION DEVICE, NAMED ENTITY EXTRACTION DEVICE, EXTRACTION METHOD, AND PROGRAM

(71) Applicant: NIPPON TELEGRAPH AND TELEPHONE CORPORATION, Tokyo (JP)

(72) Inventors: Kuniko Saito, Tokyo (JP); Nozomi Kobayashi, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 570 days.

(21) Appl. No.: 17/049,939

(22) PCT Filed: Apr. 22, 2019

(86) PCT No.: PCT/JP2019/017049
§ 371 (c)(1),
(2) Date: Oct. 22, 2020

(87) PCT Pub. No.: WO2019/208507
PCT Pub. Date: Oct. 31, 2019

(65) Prior Publication Data
US 2021/0097237 A1 Apr. 1, 2021

(30) Foreign Application Priority Data
Apr. 24, 2018 (JP) ................. 2018-083500

(51) Int. Cl.
*G06F 40/00* (2020.01)
*G06F 40/20* (2020.01)
(Continued)

(52) U.S. Cl.
CPC ............ *G06F 40/20* (2020.01); *G06F 40/263* (2020.01); *G06F 40/295* (2020.01); *G06F 40/30* (2020.01);
(Continued)

(58) Field of Classification Search
CPC ...... G06F 40/30; G06F 40/211; G06F 40/268; G06F 40/284; G06F 40/253;
(Continued)

(56) References Cited

FOREIGN PATENT DOCUMENTS

| JP | 2004258759 | 9/2004 |
| JP | 20074005477 B2 | 8/2007 |

*Primary Examiner* — Vu B Hang (57) ABSTRACT

It is an object to successfully absorb a difference in characteristics to be taken into consideration between languages and implement common named entity extraction in a processing system.

A language characteristic extraction device 11 includes a language characteristic extraction unit that selects an abstract rule corresponding to a characteristic of a target language from among a collection of abstract rules common to a plurality of languages and sets, as a language-specific characteristic extraction rule, a concrete feature extraction method suited to the target language and a definition given as an output condition, defines, for each of a plurality of target languages, the language-specific characteristic extraction rule, and extracts a feature corresponding to a language of an input sentence from a morphological analysis result of the input sentence while referring to the language-specific characteristic extraction rule defined for the language and aimed at extracting a feature related to a representation or a part of speech included in the morphological analysis result and outputs the feature as a language characteristic extraction result.

20 Claims, 7 Drawing Sheets

(51) Int. Cl.
*G06F 40/58* (2020.01)
*G06F 40/51* (2020.01)
*G06F 40/263* (2020.01)
*G06F 40/295* (2020.01)
*G06F 40/30* (2020.01)
*G06F 40/268* (2020.01)

(52) U.S. Cl.
CPC .............. *G06F 40/51* (2020.01); *G06F 40/58* (2020.01); *G06F 40/268* (2020.01)

(58) Field of Classification Search
CPC ........ G06F 40/263; G06F 9/454; G06F 40/53; G06F 40/55; G06F 40/58
See application file for complete search history.

NTT Media Intelligence Labs. was established in 2012.  — 9A

Fig. 2B

NTT media interijensu kenkyujo wa yokosuka shi ni arimasu.
(NTT Media Intelligence Labs. is located in Yokosuka City.)  — 9B

Fig. 3A

```
NTT/NNP
Media/NN
Intelligence/NN
Labs./NNP
was/VBD
established/VBN
in/IN
2012/CD
./.
```
13A

Fig. 3B

NTT/meishi: koyu (NTT/noun: proper)
media/meishi (media/noun)
interijensu/meishi (intelligence/noun)
kenkyujo/meishi setsubiji: meishi
 (laboratory/noun suffix: noun)
wa/joshi (postpositional particle)
yokosuka/meishi: koyu (Yokosuka/noun: proper)
shi/meishi setsubiji: meishi (city/noun suffix: noun)
ni/joshi (postpositional particle)
a/doshi gokan: R (located/verb stem: R)
ri/doshi katsuyo gobi (verb conjugation ending)
masu/doshi setsubiji (verb suffix)
./kuten" (./period)

| EXTRACTION RULE 1 | Substr=%form,%pre1,0,1 |
|---|---|
| EXTRACTION RULE 2 | Substr=%form,%pre2,0,2 |
| EXTRACTION RULE 3 | Substr=%form,%suf1,-1,1 |
| EXTRACTION RULE 4 | Substr=%form,%suf2,-1,2 |
| EXTRACTION RULE 5 | Substr=%form,%suf3,-1,3 |
| EXTRACTION RULE 6 | SetValue=%type,<else> |
| EXTRACTION RULE 7 | RegexMatch=%form,/^[a-z]+$/,%type,<alpha> |
| EXTRACTION RULE 8 | RegexMatch=%form,/^[A-Z]+$/,%type,<ALPHA> |
| EXTRACTION RULE 9 | RegexMatch=%form,/^[A-Z][a-z]+$/,%type,<Alpha> |
| EXTRACTION RULE 10 | RegexMatch=%form,/[0-9]/,%type,<NUM> |
| EXTRACTION RULE 11 | IsContain=%form, -, %hyphen, 1,0 |
| EXTRACTION RULE 12 | Dic=/path/dic, %form, %dic_val, LONGEST |
| OUTPUT RULE | %form,"/", %pos, "/", %pre1, "/", %pre2, "/", %suf1, "/", %suf2, "/", %suf4, "/", %type, "/", %hyphen, "/",%dic_val |

Fig. 4B

| EXTRACTION RULE 13 | RegexReplace=%pos, %pos, /^(.+):.$1/ |
|---|---|
| OUTPUT RULE | %form, "/", %pos |

Fig. 5A

```
NTT/NNP/N/NT/NTT/T/TT/NTT/<ALPHA>/0
Media/NN/M/Me/Med/a/ia/dia/<Alpha>/0
Intelligence/NN/I/In/Int/e/ce/nce/<Alpha>/0
Labs./NNP/L/La/Lab/./s./bs./<else>/0
was/VBD/w/wa/was/s/as/was/<alpha>/0
established/VBN/e/es/est/d/ed/hed/<alpha>/0
in/IN/i/in/in/n/in/in/<alpha>/0
2012/CD/2/20/201/2/12/012/<NUM>/0
././././././<else>/0
```
— 15A

Fig. 5B

NTT/meishi (NTT/noun)
media/meishi (media/noun)
interijensu/meishi (intelligence/noun)
kenkyujo/meishi setsubiji (laboratory/noun suffix)
wa/joshi (postpositional particle)
yokosuka/meishi (Yokosuka/noun)
shi/meishi setsubiji (city/noun suffix)
ni/joshi (postpositional particle)
a/doshi gokan (located/verb stem)
ri/doshi katsuyo gobi (verb conjugation ending)
masu/doshi setsubiji (verb suffix)
./kuten" (./period)

```
NTT/B-ORG
Media/I-ORG
Intelligence/I-ORG
Labs./I-ORG
was/NIL
established/NIL
in/NIL
2012/B-DAT
./NIL

NTT Media Intelligence Labs./ORG
2012/DAT
```

Fig. 6B

```
NTT/B-ORG
media (Media) /I-ORG
interijensu (Intelligence) /I-ORG
kenkyujo (Labs.) /I-ORG
wa [postpositional particle] /NIL
yokosuka (Yokosuka) /B-ORG
shi (City) /I-ORG
ni [postpositional particle] /NIL
a (located) /NIL
ri [verb conjugation ending] /NIL
masu [verb suffix] /NIL
. /NIL NTT media interijensu kenkyujo (NTT Media Intelligence Labs.) /ORG
yokosuka shi (Yokosuka City) /LOC
```

Fig. 7

LANGUAGE CHARACTERISTIC EXTRACTION DEVICE, NAMED ENTITY EXTRACTION DEVICE, EXTRACTION METHOD, AND PROGRAM

CROSS-REFERENCE TO RELATED APPLICATIONS

This application is a U.S. 371 Application of International Patent Application No. PCT/JP2019/017049, filed on 22 Apr. 2019, which application claims priority to and the benefit of JP Application No. 2018-083500, filed on 24 Apr. 2018, the disclosures of which are hereby incorporated herein by reference in their entireties.

TECHNICAL FIELD

The present disclosure relates to a language characteristic extraction device, a named entity extraction device, an extraction method, and a program.

BACKGROUND ART

Performing various processes on, e.g., text written by a human or text obtained after speech of a human is subjected to speech recognition allows advanced language processes, such as translation and information extraction. Among others, named entity extraction is an important element for understanding the contents of text because it represents the very contents, such as "who did (does) it", "where it was (is) done", and "what was (is) done", of a piece of writing. A technique related to named entity extraction is described in, for example, Patent Literature 1.

Generally, in processing in a stage preceding named entity extraction processing, word recognition (morphological analysis) is performed, and pieces of word information, each including a word representation, a part of speech, and the like, are acquired. The named entity extraction processing with front-back arrangement of pieces of word information in mind is performed using the pieces of word information as language characteristics (features). As language characteristics serving as features to be taken into consideration at the time of the named entity extraction processing, pieces of information, such as an appearance representation, a part of speech, a base-form representation, and a reading of a word in question, which are obtained in the course of the morphological analysis processing in the preceding stage, i.e. pieces of information included in a word dictionary to be referred to in morphological analysis are often used.

Which feature is effective when used for named entity extraction varies depending on original characteristics of a language. For example, it is natural in English that "Apple" is considered as a proper name (an organization name) while "apple" is considered as a general noun (an apple as a fruit), and the difference in usage between upper-case characters and lower-case characters is a major characteristic. In Japanese, however, this need not be taken into consideration. In English, the type of a word can be generalized to some extent based on information of a string of several characters at the end of the word, such as "-ing", "-es", or "-ed". Additionally, in English, it is considered effective to use a feature with information on the character type of a word, such as whether the word is composed of numeric characters and symbols or composed only of alphabets, in mind. However, an upper-case/lower-case character situation in a word, information on a character string which is a portion of a word, and information on the character type of a word described above cannot be generally acquired in the morphological analysis processing in the preceding stage. It is expected that feature information that is necessary in English is not so important in Japanese and need not be acquired, i.e., features to be taken into consideration vary greatly depending on a language.

Under the above-described circumstances, a mechanism capable of freely designing a feature to be taken into consideration in accordance with original language characteristics is required in implementation of named entity extraction that can handle a plurality of languages in a unified manner.

CITATION LIST

Patent Literature

Patent Literature 1: Japanese Patent No. 4005477

SUMMARY OF THE INVENTION

Technical Problem

A case where named entity extraction is performed not for a single language but for a plurality of languages in the same processing system suffers from the following problem: the types of characteristics to be taken into consideration differ greatly depending on a language. In a simplest case, it is conceivable to take into consideration pieces of word information, such as only a representation and a part of speech, which are output by morphological analysis processing in a preceding stage. In a more complex case, however, it may be necessary to acquire information that cannot be directly obtained as a morphological analysis result, such as the presence or absence of an upper-case character in a representation and arrangement of characters in a word.

The present disclosure has been made in view of the above-described points, and has as its object to provide a named entity extraction device, an extraction method, and a program capable of, at the time of named entity extraction for a plurality of languages, successfully absorbing a difference in characteristics to be taken into consideration between languages in named entity extraction by a unified processing system and implementing common named entity extraction in the processing system, even in a case where characteristics to be focused on vary depending on a language.

Means for Solving the Problem

To attain the above-described object, a language characteristic extraction device according to a first aspect of the present disclosure includes a language characteristic extraction unit, the language characteristic extraction unit selecting an abstract rule corresponding to a characteristic of a target language from among a collection of abstract rules common to a plurality of languages, setting, as a language-specific characteristic extraction rule, a concrete feature extraction method suited to the target language and a definition given as an output condition, defining, for each of a plurality of target languages, one of a plurality of the language-specific characteristic extraction rules, extracting a feature corresponding to a language of an input sentence from a morphological analysis result of the input sentence while referring to the language-specific characteristic extraction rule defined for the language and aimed at extracting a feature related to a representation or a part of speech included in the morphological analysis result, outputting the feature as a language characteristic extraction result.

To attain the above-described object, a named entity extraction device according to a second aspect of the present disclosure includes a language characteristic extraction unit, the language characteristic extraction unit selecting an abstract rule corresponding to a characteristic of a target language from among a collection of abstract rules common to a plurality of languages, setting, as a language-specific characteristic extraction rule, a concrete feature extraction method suited to the target language and a definition given as an output condition, defining, for each of a plurality of target languages, one of a plurality of the language-specific characteristic extraction rules, extracting a feature corresponding to a language of an input sentence from a morphological analysis result of the input sentence while referring to the language-specific characteristic extraction rule defined for the language and aimed at extracting a feature related to a representation or a part of speech included in the morphological analysis result, outputting the feature as a language characteristic extraction result, language-specific named entity extraction models, the language-specific named entity extraction models using a machine learning algorithm common to the plurality of target languages, being learned in advance so as to receive the language characteristic extraction result as an input and output a named entity extraction result, for each of the plurality of target languages, and a named entity extraction unit, the named entity extraction unit receiving, as an input, the language characteristic extraction result output from the language characteristic extraction unit, executing named entity extraction processing using the named entity extraction model corresponding to the language of the input sentence, outputting an extracted named entity.

In a named entity extraction device according to a third aspect of the present disclosure in the extraction device according to the first aspect or the second aspect, the collection of abstract rules is composed of a rule for capturing a characteristic of a character situation in a word, a rule for replacing word information in a different perspective, and a rule for implementing sifting-out of a useful feature quantity for each language.

In an extraction device according to a fourth aspect of the present disclosure in the extraction device according to the first aspect or the second aspect, the collection of abstract rules includes a rule for extracting a partial character string at an arbitrary site, a rule for extracting a character string by performing at least one of replacement, insertion, and deletion of a partial character string at an arbitrary site, a rule for giving particular label information to an expression matching a predetermined pattern, and a rule for determining whether an expression matches the predetermined pattern.

To attain the above-described object, an extraction method according to a fifth aspect of the present disclosure is a language characteristic extraction method including a step of, by a language characteristic extraction unit, selecting an abstract rule corresponding to a characteristic of a target language from among a collection of abstract rules common to a plurality of languages and setting, as a language-specific characteristic extraction rule, a concrete feature extraction method suited to the target language and a definition given as an output condition, defining, for each of a plurality of target languages, one of a plurality of the language-specific characteristic extraction rules, and extracting a feature corresponding to a language of an input sentence from a morphological analysis result of the input sentence while referring to the language-specific characteristic extraction rule defined for the language and aimed at extracting a feature related to a representation or a part of speech included in the morphological analysis result and outputting the feature as a language characteristic extraction result.

To attain the above-described object, an extraction method according to a sixth aspect of the present disclosure is a named entity extraction method including a step of, by a language characteristic extraction unit, selecting an abstract rule corresponding to a characteristic of a target language from among a collection of abstract rules common to a plurality of languages and setting, as a language-specific characteristic extraction rule, a concrete feature extraction method suited to the target language and a definition given as an output condition, defining, for each of a plurality of target languages, one of a plurality of the language-specific characteristic extraction rules, and extracting a feature corresponding to a language of an input sentence from a morphological analysis result of the input sentence while referring to the language-specific characteristic extraction rule defined for the language and aimed at extracting a feature related to a representation or a part of speech included in the morphological analysis result and outputting the feature as a language characteristic extraction result, and a step of, by a named entity extraction unit, receiving, as an input, the language characteristic extraction result output from the language characteristic extraction unit and executing named entity extraction processing using, among language-specific named entity extraction models using a machine learning algorithm common to the plurality of target languages and being learned in advance so as to receive the language characteristic extraction result as an input and output a named entity extraction result, for each of the plurality of target languages, a language-specific named entity extraction model corresponding to the language of the input sentence, and outputting an extracted named entity.

To attain the above-described object, a program according to a seventh aspect of the present disclosure is a program for causing a computer to function as the units of an extraction device according to any one of the first aspect to the fourth aspect.

Effects of the Invention

According to the present disclosure, the effect of supporting characteristics to be taken into consideration for each of languages, successfully absorbing a difference between the languages, and implementing common named entity extraction in a processing system is obtained.

DESCRIPTION OF EMBODIMENT

An embodiment of the present disclosure will be described below in detail with reference to the drawings. Note that, in a language processing technique, a feature quantity of a language is also called a "feature". In the present disclosure, an original characteristic of a language is referred to as a "characteristic" while a feature quantity extracted for named entity extraction is referred to as a "feature".

Outline of Present Embodiment

At the time of named entity extraction for a plurality of languages, the present disclosure implements a named entity extraction device with the configurations (1) to (3) below in order to perform named entity extraction in a unified processing system even if characteristics to be focused on vary depending on a language.

(1) Morphological analysis processing corresponding to a language is executed to output a morphological analysis result.

(2) Language characteristic extraction processing is executed on the morphological analysis result while an extraction rule set in a language-specific manner in accordance with characteristics of the language is referred to. Features are extracted and output the features as a language characteristic extraction result.

(3) Named entity extraction processing is performed on the language characteristic extraction result to output a named entity as an extraction result.

What absorbs a characteristic for each language is the language characteristic extraction processing in (2) above, and how to take out a characteristic in the processing is set differently for different languages. How to take out a characteristic for each language is specified in the extraction rule. The named entity extraction processing in (3) above itself is not language-dependent and is assumed to operate on a language characteristic extraction result obtained as a result of the language characteristic extraction processing in (2) in the same processing system. Note that, in the present embodiment, an existing morphological analysis technique is used for the morphological analysis processing in (1) above. According to the present embodiment, it is possible to introduce an arbitrary morphological analysis technique corresponding to each language and implement a named entity extraction device which supports many languages by adding the processing in (2) and (3) above as processing in a subsequent stage.

Figure 1:
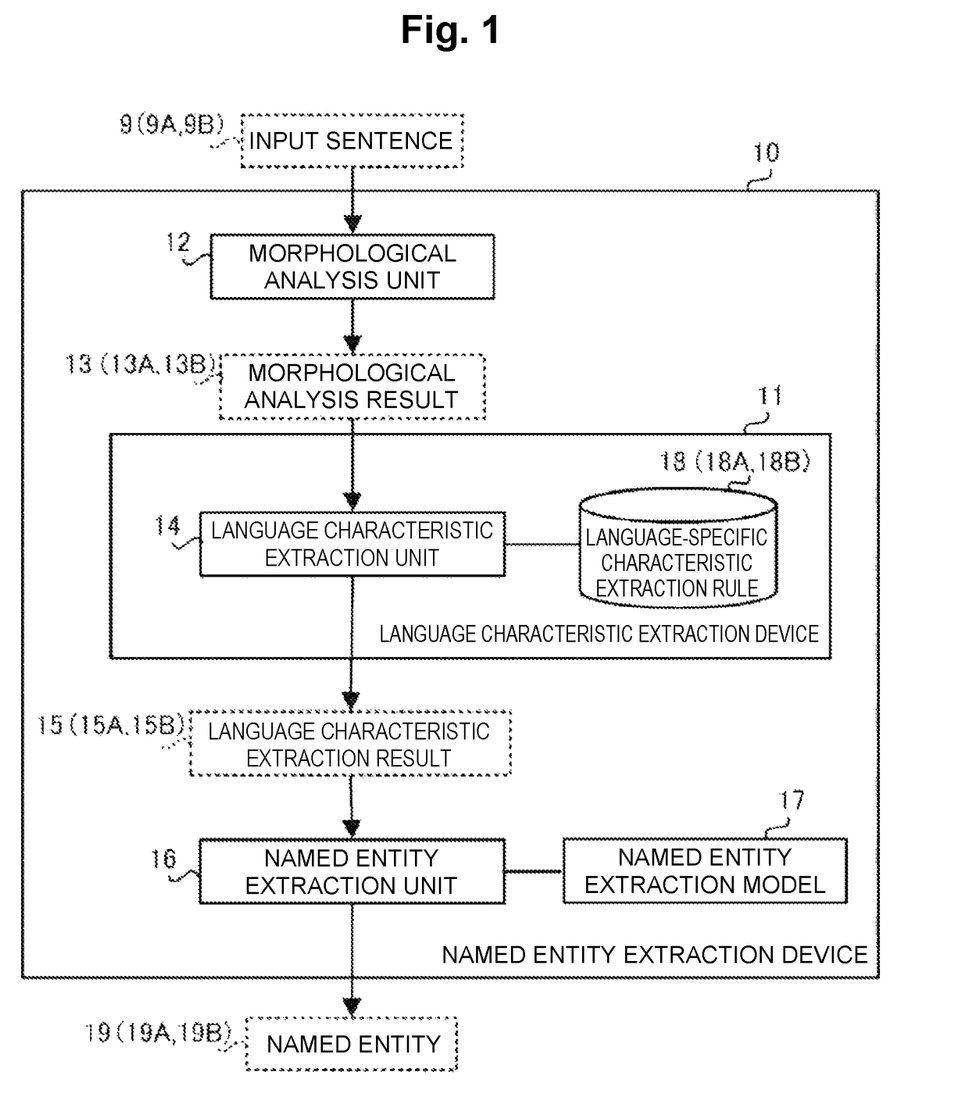
FIG. 1 is a configuration diagram showing a configuration of an example of a named entity extraction device according to an embodiment.

Configuration of Named Entity Extraction Device According to Present Embodiment A configuration of a named entity extraction device according to the present embodiment will be described. FIG. 1 shows a configuration diagram representing a configuration of an example of a named entity extraction device 10 according to the present embodiment. The named entity extraction device 10 according to the present embodiment shown in FIG. 1 analyzes an input sentence 9 as text and extracts named entities, such as a personal name, a geographical name, an organization name, and a trade name, from the input sentence 9.

As shown in FIG. 1, the named entity extraction device 10 according to the present embodiment includes a language characteristic extraction device 11, a morphological analysis unit 12, a named entity extraction unit 16, and a named entity extraction model 17. The language characteristic extraction device 11 includes a language characteristic extraction unit 14 and a language-specific characteristic extraction rule 18.

The named entity extraction device 10 according to the present embodiment shown in FIG. 1 can be constructed using a computer including a central processing unit (CPU), a random access memory (RAM), and a read only memory (ROM) storing a program for executing a named entity extraction processing routine (to be described later) and various types of data. More specifically, the CPU executing the program functions as the language characteristic extraction device 11 (the language characteristic extraction unit 14), the morphological analysis unit 12, and the named entity extraction unit 16 of the named entity extraction device 10 shown in FIG. 1.

The input sentence 9 is input from outside the device to the morphological analysis unit 12 of the named entity extraction device 10. A case where an input sentence 9A ("NTT Media Intelligence Labs. was established in 2012.") illustrated in FIG. 2A when a language in use is English or an input sentence 9B ("NTT media interijensu kenkyujo wa yokosuka shi ni arimasu." (NTT Media Intelligence Labs. is located in Yokosuka City.)) illustrated in FIG. 2B when the language in use is Japanese is input to the named entity extraction device 10 will be described below as a concrete example.

The morphological analysis unit 12 executes morphological analysis processing on the input sentence 9 input and outputs a morphological analysis result 13. An arbitrary existing morphological analysis technique can be used for the morphological analysis processing. Note that the morphological analysis unit 12 works in accordance with the language of the input sentence 9, and uses a morphological analysis technique for English if the language is English and uses a morphological analysis technique for Japanese if the language is Japanese. With the morphological analysis processing, the input sentence 9 is divided into words, and the morphological analysis result 13 with pieces of word information, such as a part of speech and a base form, added thereto is obtained as an output. In other words, the morphological analysis result 13 for each language is composed of respective combinations, each having a representation, a part of speech, a base-form representation, a reading, and the like, for morphemes constituting the input sentence 9. Note that although, among the elements, the representation and the part of speech are essential for the morphological analysis result 13, the base-form representation and the reading are not essential.

Figure 2A:
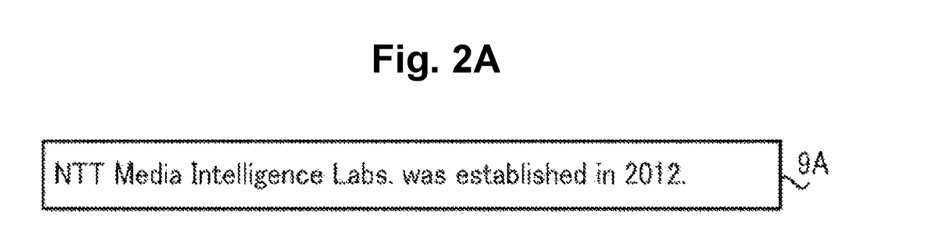
FIG. 2A is an example of an input sentence in a case where a language in use is English.
Figure 3A:
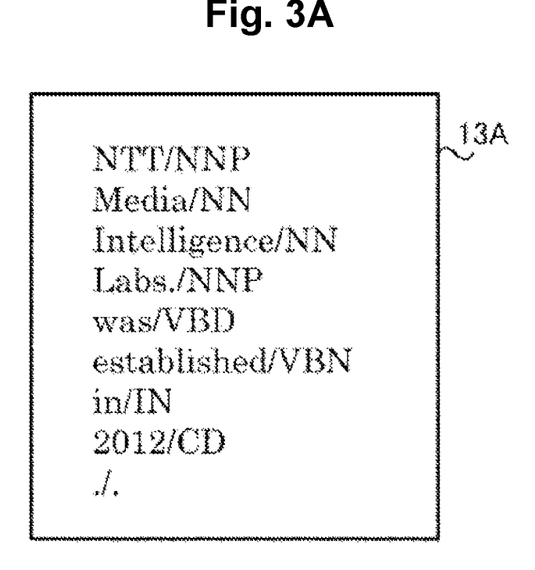
FIG. 3A is a view showing an example of a morphological analysis result output from a morphological analysis unit of the named entity extraction device according to the embodiment if the language of an input sentence is English.

For example, if the morphological analysis unit 12 executes the morphological analysis processing on the input sentence 9A illustrated in FIG. 2A, a morphological analysis result 13A illustrated in FIG. 3A is obtained. More specifically, "NTT/NNP", "Media/NN", "Intelligence/NN", "Labs./NNP", "was/VBD", "establishd/VBN", "in/IN", "2012/CD", and "./." are obtained as the morphological analysis result 13A, as shown in FIG. 3A. Note that "NNP" represents a proper noun, "NN" represents a noun in the singular, "VBD" represents a verb in the past tense, "IN" represents a preposition or a cascade conjunction, "CD" represents a cardinal number, and "." represents a period.

Figure 2B:
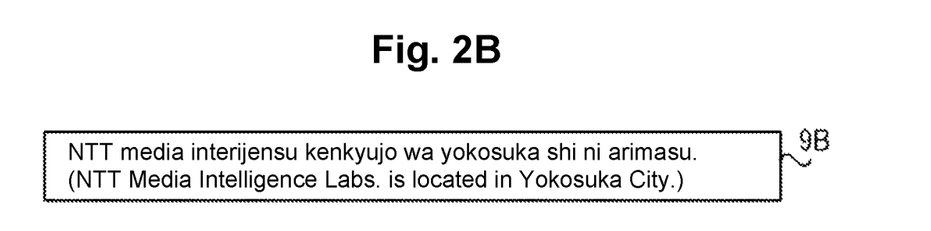
FIG. 2B is an example of an input sentence in a case where the language in use is Japanese.
Figure 3B:
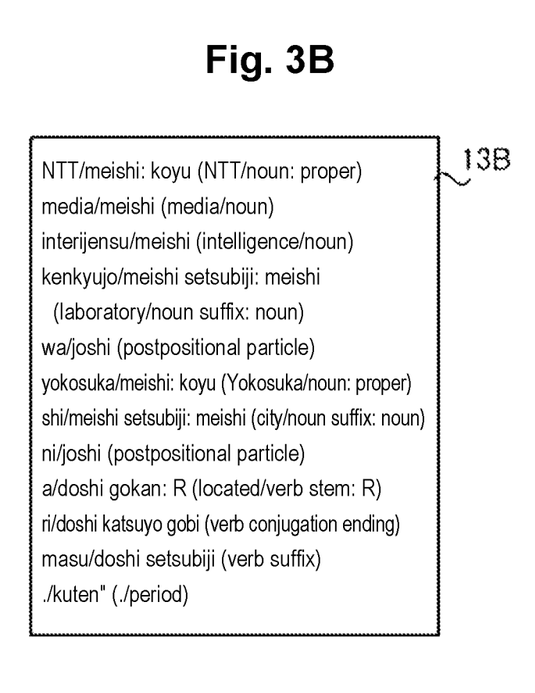
FIG. 3B is a view showing an example of a morphological analysis result output from the morphological analysis unit of the named entity extraction device according to the embodiment if the language of an input sentence is Japanese.

For example, if the morphological analysis unit 12 executes the morphological analysis processing on the input sentence 9B illustrated in FIG. 2B, a morphological analysis result 13B illustrated in FIG. 3B is obtained. More specifically, "NTT/meishi: koyu" (NTT/noun: proper), "media/meishi" (media/noun), "interijensu/meishi" (intelligence/noun), "kenkyujo/meishi setsubiji: meishi" (laboratory/noun suffix: noun), "wa/joshi" (postpositional particle), "yokosuka/meishi: koyu" (Yokosuka/noun: proper), "shi/meishi setsubiji: meishi" (city/noun suffix: noun), "ni/joshi" (postpositional particle), "a/doshi gokan: R" (located/verb stem: R), "ri/doshi katsuyo gobi" (verb conjugation ending), "masu/doshi setsubiji" (verb suffix), and "./kuten" (./period) are obtained as the morphological analysis result 13B, as shown in FIG. 3B.

The morphological analysis result 13 output from the morphological analysis unit 12 is input to the language characteristic extraction unit 14. The language characteristic extraction unit 14 executes language characteristic processing that extracts a feature while referring to the language-specific characteristic extraction rule 18 and outputs a language characteristic extraction result 15.

In the present embodiment, an extraction rule (extraction rules) described using rules A to F below that are examples of an abstract rule and an output rule (to be described later) are included in the language-specific characteristic extraction rule 18 in one example. In the language-specific characteristic extraction rule 18 according to the present embodiment, (I) to (III) below are implemented by the abstract rules.

(I) A characteristic of a character situation in a word, including upper-case/lower-case characters, characters in the word, the presence or absence of a particular character or character string, and character type, is captured.

(II) A piece of word information, such as a representation or a part of speech, is replaced in a different perspective through transformation into a concept superordinate or subordinate to a category, such as word type or part of speech, and reference to external knowledge, such as a dictionary.

(III) A useful feature quantity is sifted out for each language.

The language characteristic extraction unit 14 extracts a feature from the morphological analysis result 13 based on the language-specific characteristic extraction rule 18 that regards, as an object (target), any element in a morphological analysis result (a representation (% form), a part of speech (% pos), and the like (to be described later in detail)) and is described using rules A to F below, the language-specific characteristic extraction rule 18 corresponding to the language of the input sentence 9. As for the feature extraction, processing is performed for each morpheme (i.e., each line in FIG. 3). At the time of the feature extraction, a value of the variable % form for a representation or the variable % pos for a part of speech is acquired from each morpheme result and is processed. Note that although a case where the language-specific characteristic extraction rule 18 is described using rules A to F will be described as an example in the present embodiment, it is not essential to use rules E and F among the rules.

Rule A: A rule (represented as "Substr") for extracting a partial character string at an arbitrary site.

Rule B: A rule (represented as "RegexReplace") for extracting a partial character string at an arbitrary site by performing replacement, insertion, or deletion.

Rule C: A rule (represented as "RegexMatch") for giving particular label information to an expression matching a predetermined pattern.

Rule D: A rule (represented as "IsContain") for determining whether an expression is one matching a predetermined pattern.

Rule E: A rule (represented as "Dic") for referring to dictionary information (external data).

Rule F: A rule (represented as "SetValue") for initializing extraction information.

Here, the output rule (see FIGS. 4A and 4B) may be applied to information extracted from the morphological analysis result 13 in accordance with the extraction rules described using the rules A to F above to set information to be finally used as a feature and the format thereof.

Figure 4A:
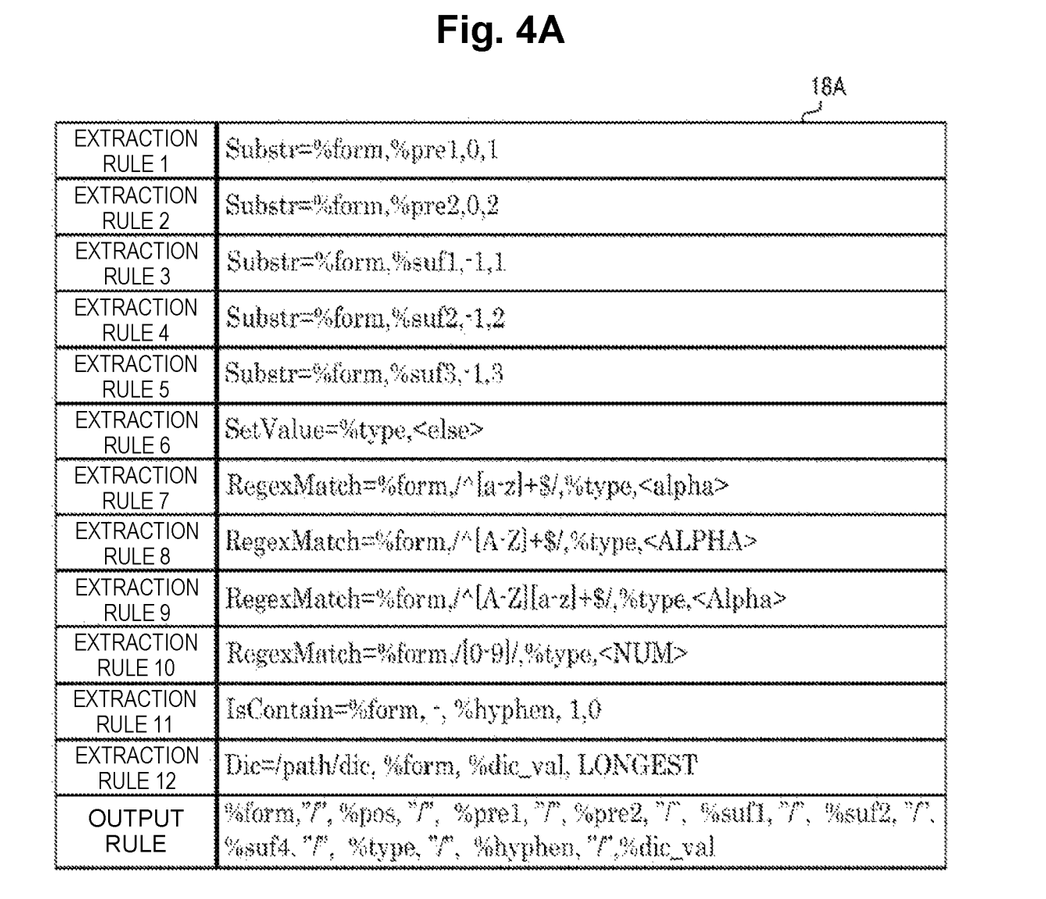
FIG. 4A is a chart showing an example of a language-specific characteristic extraction rule for the case where the language in use is English.
Figure 4B:
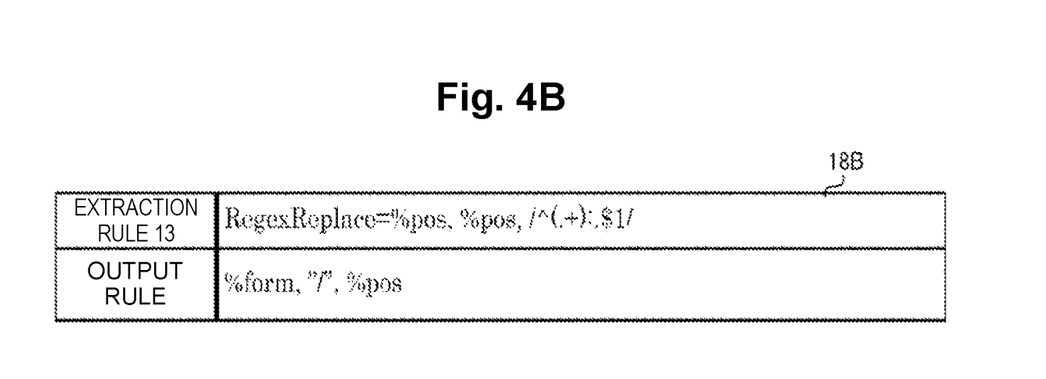
FIG. 4B is a chart showing an example of a language-specific characteristic extraction rule for the case where the language in use is Japanese.

As described earlier, since characteristics to be focused on vary depending on a language, the language-specific characteristic extraction rule 18 is assumed to be described for each language using any (at least one) of rules A to F above. FIG. 4A shows an example of a language-specific characteristic extraction rule 18A for English that is the language-specific characteristic extraction rule 18 for the case where the language in use is English. FIG. 4B shows an example of a language-specific characteristic extraction rule 18B for Japanese that is the language-specific characteristic extraction rule 18 for the case where the language in use is Japanese.

The language characteristic extraction processing is based on the assumption that a word representation (% form) and a part of speech (% pos) included in the morphological analysis result 13 are used to perform character string processing and dictionary lookup. The language characteristic extraction rules shown in FIGS. 4A and 4B are each a conceptual expression of the language characteristic extraction processing to be performed by the language characteristic extraction unit 14, and an expression method for this may adopt an arbitrary form. Assume that, in programmatic terms, the expression is transformed into processing, such as character string search based on a regular expression or dictionary search using a value of % form, and that the processing is performed.

As described above, preliminary definition of a collection of common rules makes it possible to select a rule from among the collection of rules in accordance with characteristics of each target language and define a concrete language characteristic extraction rule corresponding to a language as a processing object. Additionally, in an output rule at the time of finally outputting a feature, a definition as to whether to output each feature and designation of an output format (e.g., designation of "/" as a delimiter between features) can be described. This allows easy setting of features of each language, control of the number of types of features, and form unification.

As described above, introduction of a mechanism capable of freely, flexibly, and easily performing design and management of features to be taken into consideration and outputting uniform feature extraction results makes it possible to successfully absorb a difference in characteristics to be taken into consideration between languages and implement commonalization of processing in the named entity extraction unit 16 in a subsequent stage.

First, the language-specific characteristic extraction rule 18A for English illustrated in FIG. 4A will be described in detail.

Extraction rules 1 to 5 of the language-specific characteristic extraction rule 18A are described using the rule A above. In extraction rules 1 to 5, "Substr" is expressed as in "Substr=target,key,start byte position,byte count".

Extraction rule 1 means taking out, as a partial character string, bytes for the byte count (one byte) from the start byte position (the 0-th byte) from the target (% form for a word representation here) and storing the partial character string in the key (% pre1 here). For example, in the case of the representation "NTT", the partial character string "N" is taken out and is stored in % pre1 according to the extraction rule 1. In the case of extraction rule 2, two bytes are taken out from the beginning, and % pre2="NT".

In the case of each of extraction rules 3 to 5, the start byte position is −1 (=the end), and one byte, two bytes, or three bytes are taken out from the start byte position and are stored in % suf1, % suf2, or % suf3. For example, in the case of the representation "playing", "g" is stored in % suf1, "ng" is stored in % sufs2, and "ing" is stored in % sufs2. As described above, a partial character string at an arbitrary site of a word representation can be taken out according to the extraction rules 1 to 5.

Note that although an extraction rule focused on several characters starting at the beginning or the end of a word is adopted in this example, an extraction rule focused not on two ends of a word but on a central portion may be designed depending on a language characteristic. In any case, it is important that an extraction rule focused not on a representation of the whole word but on a partial character string can be set.

Extraction rule 6 of the language-specific characteristic extraction rule 18A is described using the rule F above. In extraction rule 6, "SetValue" is expressed as in "SetValue=key,value", and the key is set to the value.

In the extraction rule 6, % type as the key representing word type is set to <else>.

Extraction rules 7 to 10 of the language-specific characteristic extraction rule 18A are described using the rule C above. In the extraction rules 7 to 10, "RegexMatch" is expressed as in "RegexMatch=target,condition,key,value", and the key is set to the value if the target matches the condition. In the case of the extraction rule 7, if only lower-case alphabetical characters are included in a word representation (% form), % type is set to <alpha>. In the case of the extraction rules 8 to 10, % type is set to <ALPHA> if only upper-case alphabetical characters are included, is set to <Alpha> if only a character at the beginning is an upper-case character, and characters subsequent thereto are all lower-case characters, and is set to <NUM> if a numerical character is included.

According to the extraction rules 6 to 10, a word can be classified depending on characters included in the word into one of the five categories: <alpha>, <ALPHA>, <Alpha>, <NUM>, and <else>.

Extraction rule 11 of the language-specific characteristic extraction rule 18A is described using the rule D above. In the extraction rule 11, "IsContain" is expressed as in "IsContain=target,condition,key,value1,value2", and the key is set to the value1 if the target includes a character designated in the condition and is set to the value2 if the target does not include such a character.

In the case of the extraction rule 11, if a hyphen (-) is included in a word representation (% form), % hyphen is set to "1"; otherwise, % hyphen is set to "0". With this extraction rule, it is possible to sense, as a characteristic, whether a particular character is included in a morphological analysis result. For example, there are many English expressions, such as "mid-December", "al-Jazeera", and "late-Qing", which each include a hyphen (-) to function as a compound word. As for such compound words, there are a huge number of types of combinations. All appearance patterns cannot be expected to be present in learning data. For this reason, it is expected that capture of the characteristic of the presence or absence of a hyphen allows abstraction and capture of appearance of a wide variety of compound words.

Extraction rule 12 of the language-specific characteristic extraction rule 18A is described using the rule E above. In the extraction rule 12, "Dic" is expressed as in "Dic=dictionary path,target,value,checking type". Dictionary search with the checking type designating the target as a key is performed on a dictionary presented by the dictionary path, and dictionary-registered information is stored in the value.

In the case of the extraction rule 12, dictionary search is performed on a dictionary in "/path/dic" using % form for a word representation as a key by the longest match principle (LONGEST). If matching word is present in the dictionary, the dictionary-registered information of the dictionary is stored in odic val. With this extraction rule, it is possible to refer, from a morphological analysis result, to some external information source and take out, as a characteristic, information included in the external information source.

The language-specific characteristic extraction rule 18B for Japanese illustrated in FIG. 4B will be described in detail.

Extraction rule 13 of the language-specific characteristic extraction rule 18B is described using the rule B above. In the extraction rule 13, "RegexReplace" is expressed as in "Regreplace=replacement destination,replacement source, condition", the condition is applied to the replacement source, and a result is stored in the replacement destination.

In the case of the extraction rule 13, only a portion within a range to immediately before ":" is taken out from a part of speech (% pos), and the part of speech (% pos) is replaced with the portion. For example, in the case of the noun "doshi: sahen" (verb: sa-column irregular conjugation), the noun is replaced with only "doshi" (verb) as a part of speech.

In the above-described manner, possession of the language-specific characteristic extraction rule 18 allows characteristic extraction processing, such as taking out a character string within a range to be focused on from a word representation, taking out a difference in usage between upper-case characters and lower-case characters as word type, and using, as a characteristic, whether a particular character is included or information included in an external dictionary referred to, in the case of English.

The language-specific characteristic extraction rule 18 implements (I) to (III) above, as described above. English and many European languages have the following characteristic: a change in a portion of a word, such as a conjugation ending, a declension, or a case conversion, changes the role of the word. Thus, (I) and (III) above are used, and (I), in particular, is important. In contrast, since there is no inflection in a word in principle in Japanese, Chinese, Korean, and the like, only (III) above is used. Note that if (II) above is obtained for languages in general, (II) may be added. The language-specific characteristic extraction rule 18 has a mechanism for commonly handling many languages in such a broad approach.

For example, in the case of Japanese, it is possible to extract only minimum necessary features using an output rule after performing conversion that uses only a first part of speech (a main part of speech serving as a centerpiece) among parts of speech, on the assumption that only pieces of information (a representation, a part of speech, and a base form) obtained by the morphological analysis processing in the morphological analysis unit 12 are used in principle.

Figure 5A:
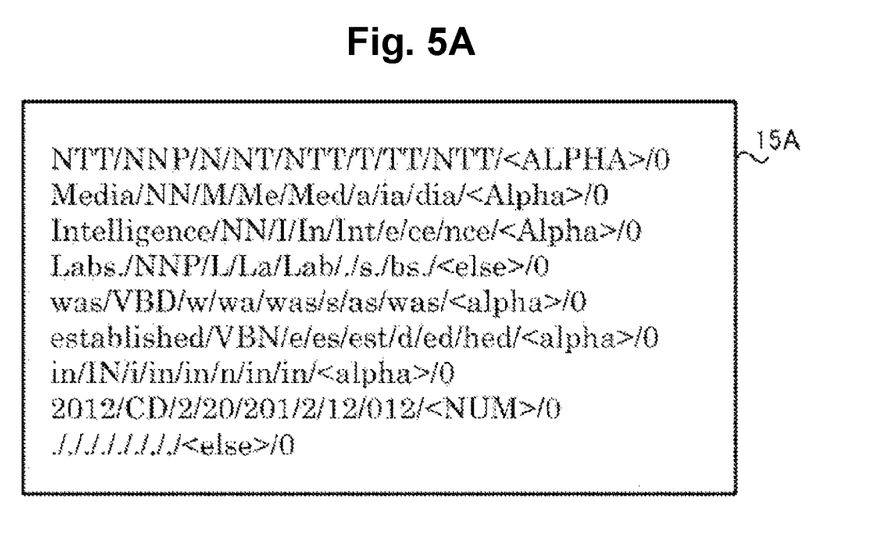
FIG. 5A is a view showing an example of a language characteristic extraction result output from a language characteristic extraction unit of the named entity extraction device according to the embodiment if the language of an input sentence is English.
Figure 5B:
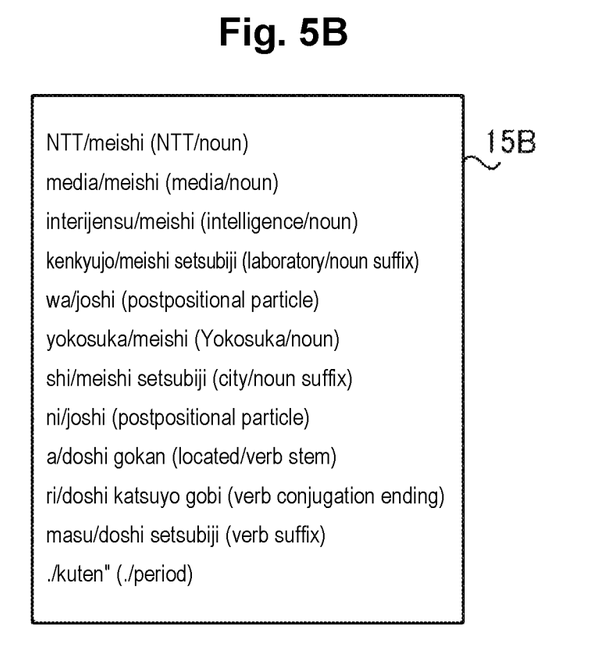
FIG. 5B is a view showing an example of a language characteristic extraction result output from the language characteristic extraction unit of the named entity extraction device according to the embodiment if the language of an input sentence is Japanese.

The language characteristic extraction unit 14 outputs extracted features as the language characteristic extraction result 15. FIG. 5A shows a result of outputting, on a morpheme-by-morpheme basis, features extracted from the morphological analysis result 13A of the input sentence 9A based on the language-specific characteristic extraction rule 18A (the extraction rules 1 to 12 and the output rule) illustrated in FIG. 4A. FIG. 5B shows a result of outputting, on a morpheme-by-morpheme basis, features extracted from the morphological analysis result 13B of the input sentence 9B based on the language-specific characteristic extraction rule 18B (the extraction rule 13 and the output rule) illustrated in FIG. 4B.

As described earlier, the input morphological analysis result 13 and all of extracted features need not be used for named entity extraction. In each of the examples in FIGS. 5A and 5B, only features defined in the output rule in the language-specific characteristic extraction rule 18A or 18B illustrated in FIG. 4A or 4B are output as final features. For example, among pieces of information (a representation, a part of speech, and a base form) obtained from the morphological analysis result 13, the piece of information of the base form is not output.

Note that the extraction rules 1 to 13 shown here are intended to capture a characteristic of characters in a representation, such as some of characters in a word, character-type-based word type (an upper-case/lower-case character situation), or inclusion of a particular character. The extraction rules 1 to 13 are also intended to acquire information by referring to an external dictionary using a portion of part-of-speech information or a representation. These are extraction rules which extract a language characteristic by taking out a portion, such as a partial character string, or making a replacement in a different perspective, such as word type, based on general morpheme information obtained through the morphological analysis processing by the morphological analysis unit 12, i.e., morpheme dictionary information, such as a representation, a part of speech, and a base form. Not only concrete extraction rules 1 to 13 illustrated here but also various extraction rules may be set as long as the extraction rules are extraction rules which capture a characteristic in a different perspective based on morpheme information. In any case, since characteristics to be focused on vary depending on a language, an extraction rule capable of extracting a characteristic commensurate with each language is set as the language-specific characteristic extraction rule 18, and the language characteristic extraction unit 14 uses the language-specific characteristic extraction rule 18. For this reason, a difference between languages can be absorbed in the language-specific characteristic extraction rule 18.

The language characteristic extraction result 15 output from the language characteristic extraction unit 14 is input to the named entity extraction unit 16. The named entity extraction unit 16 executes named entity extraction processing and outputs an extracted named entity 19 to outside the named entity extraction device 10.

An existing technique can be used as a named entity extraction technique to be used by the named entity extraction unit 16.

Typical examples of a named entity as an object to be extracted by the named entity extraction processing are of the eight types: a personal name, a location name, an organization name, a money amount, a date, a time, a percentage, and an artifact name which are defined by a workshop (called IREX as an abbreviation) for a named entity extraction technique for Japanese. The named entity types are expressed as <PSN>, <LOC>, <ORG>, <MNY>, <DAT>, <TIM>, <PCT>, and <ART>. As for named entity types, the named entity extraction unit 16 according to the present embodiment sets, as named entity types to be extracted, nine types obtained by adding, to the eight types, <NIL> to express a morpheme which is not actually a named entity as one type of named entity.

With the fact that each named entity is composed of at least one morpheme in mind, "B-" representing a morpheme at the beginning of a named entity and "I-" representing a morpheme at a midpoint of a named entity are further added to named entity types in order to differentiate between a morpheme at the beginning of a named entity and any other morpheme. Note that the differentiation is not performed for "NIL".

In the named entity extraction processing based on the named entity extraction model 17 that is a statistical model, a named entity label string is derived from a morpheme string as the morphological analysis result 13 using a statistical model so as to have a highest probability. Normal named entity extraction processing is performed on the morphological analysis result 13 itself, i.e., only representations, parts of speech, base forms, and the like as a morpheme string. In the present embodiment, a morpheme string (the language characteristic extraction result 15) having features obtained by the language characteristic extraction unit 14 can be used. Thus, the named entity extraction device 10 according to the present embodiment can implement named entity extraction processing using more language characteristics than a conventional technique.

Note that a support vector machine (SVM), a conditional random field (CRF), or the like which is an existing machine learning algorithm may be used as a learning algorithm for the named entity extraction model 17. The language-specific named entity extraction model 17 learned in advance so as to receive the language characteristic extraction result 15 as an input and output a named entity extraction result is constructed in advance using a machine learning algorithm common to a plurality of languages as possible languages for the input sentences 9. For example, the named entity extraction model 17 for each language is learned using a plurality of pieces of learning data for the language, each piece of learning data being a combination of the language characteristic extraction result 15 obtained for a sentence in the language and a named entity extraction result given in advance, by the machine learning algorithm common to the languages. If various language characteristics as in English are taken into consideration at this time, it is expected that the number of features is much larger than in a normal case where only representations and parts of speech are regarded as objects. The number of features is directly related to a model size. A too-large model size raises fears that the disk capacity of a computer to execute may become scarce. In this case, it is important to, at the time of learning, take measures to reduce the number of features, such as deleting features whose appearance frequencies are low (e.g., the number of appearances is not more than five), reducing the number of anterior and posterior morphemes (generally called a window size) when a combination of features is taken into consideration, and leaving a combination of a plurality of features out of consideration, and set an optimum feature pattern while examining a relationship between analysis accuracy and model size. Use of the above-described output rules makes it possible to easily control the number of features, the number of types of features, and the like for each language.

Figure 6A:
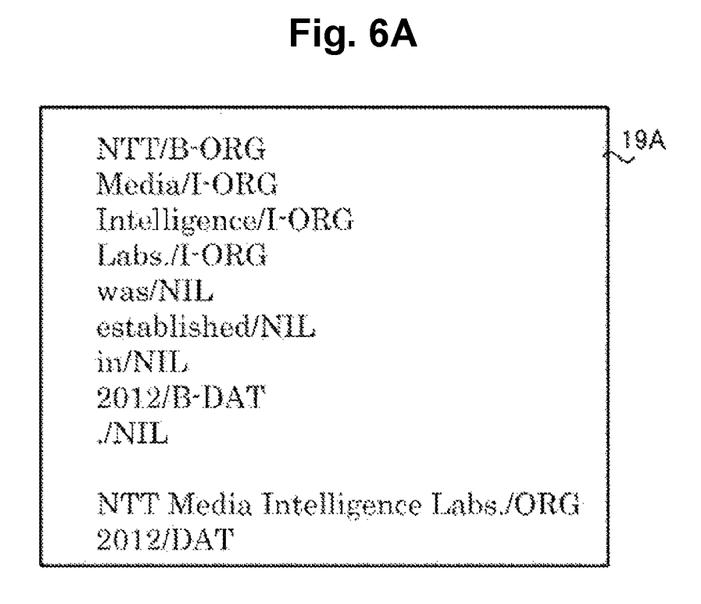
FIG. 6A is a view showing an example of an output from the named entity extraction device according to the embodiment if the language of an input sentence is English.
Figure 6B:
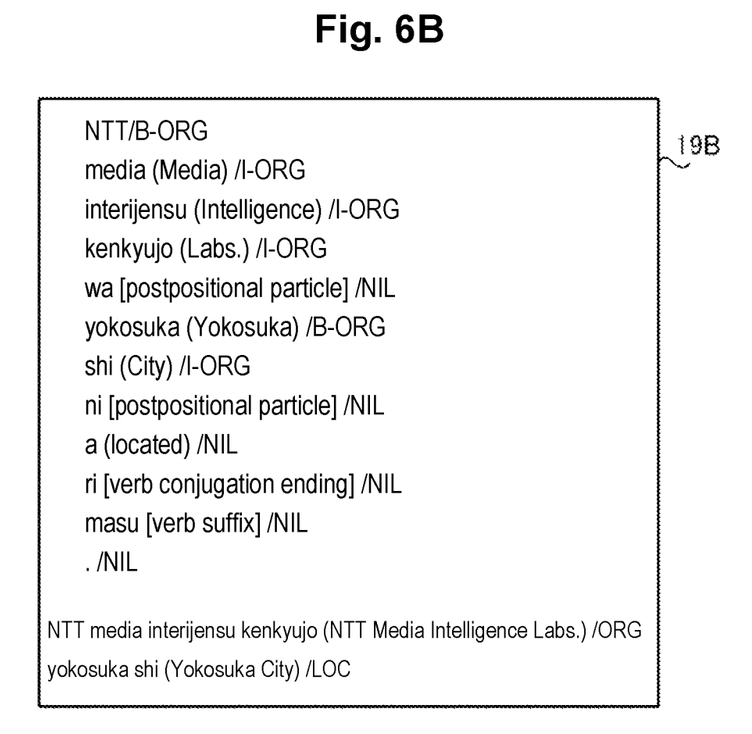
FIG. 6B is a view showing an example of an output from the named entity extraction device according to the embodiment if the language of an input sentence is Japanese.

FIG. 6A shows an example of a named entity 19A which is output as a result of performing the named entity extraction processing based on a language characteristic extraction result 15A corresponding to the input sentence 9A by the named entity extraction unit 16. FIG. 6B shows an example of a named entity 19B which is output as a result of performing the named entity extraction processing based on a language characteristic extraction result 15B corresponding to the input sentence 9B by the named entity extraction unit 16.

Action of Named Entity Extraction Device According to Present Embodiment

The action of the named entity extraction device 10 according to the present embodiment will be described. The named entity extraction device 10 executes a named entity extraction processing routine, an example of which is shown in FIG. 7, when the input sentence 9 is input.

Figure 7:
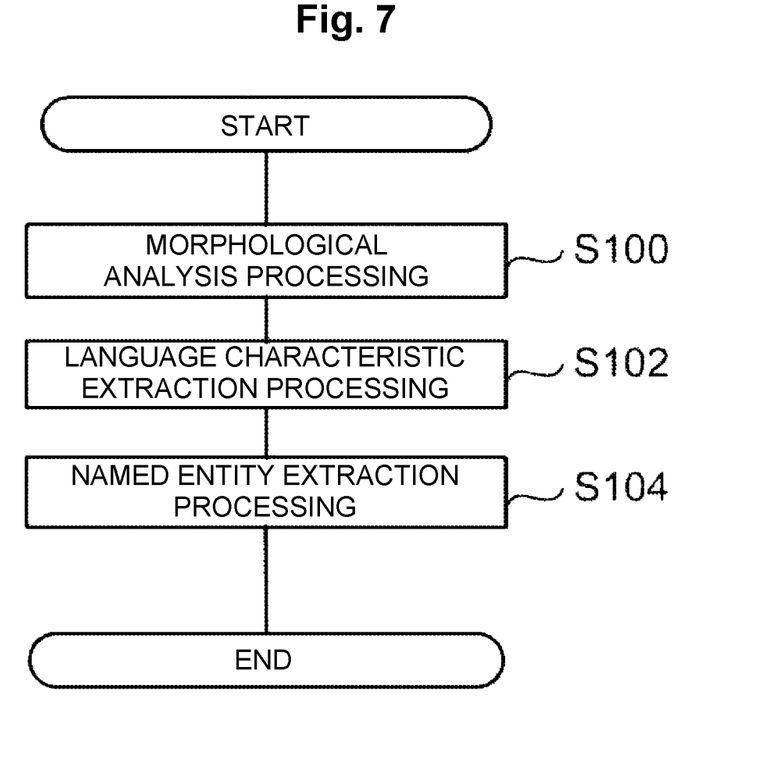
FIG. 7 is a flowchart showing an example of a named entity extraction processing routine to be executed by the named entity extraction device according to the embodiment.

As shown in FIG. 7, in step S100, the morphological analysis unit 12 performs the morphological analysis processing on the input sentence 9 input, and outputs the morphological analysis result 13, as described above. The morphological analysis result 13 output from the morphological analysis unit 12 is input to the language characteristic extraction unit 14.

In next step S102, the language characteristic extraction unit 14 executes the language characteristic processing that extracts a feature on the input morphological analysis result 13 while referring to the language-specific characteristic extraction rule 18 and outputs the language characteristic extraction result 15 with extracted features added thereto, as described above. The language characteristic extraction unit 14 according to the present embodiment refers to the language-specific characteristic extraction rule 18 described using rules corresponding to the language of the input sentence 9 at the time of execution of the language characteristic processing, as described above. The language characteristic extraction result 15 output from the language characteristic extraction unit 14 is input to the named entity extraction unit 16.

In next step S104, the named entity extraction unit 16 executes the named entity extraction processing, as described above, outputs the extracted named entity 19 to outside the named entity extraction device 10, and then ends the named entity extraction processing. The named entity extraction unit 16 according to the present embodiment executes named entity extraction processing corresponding to the language, to which the language-specific named entity extraction model 17 that uses the machine learning algorithm common to the plurality of languages as possible languages for the input sentences 9 and is learned in advance so as to receive the language characteristic extraction result 15 as an input and output a named entity is applied, as described above.

As has been described above, the language characteristic extraction device 11 according to the present embodiment includes the language characteristic extraction unit 14, the language characteristic extraction unit 14 selecting an abstract rule corresponding to a characteristic of a target language from among a collection of abstract rules common to a plurality of languages, setting, as the language-specific characteristic extraction rule 18, a concrete feature extraction method suited to the target language and a definition given as an output condition, defining, for each of a plurality of target languages, the language-specific characteristic extraction rule 18, extracting a feature corresponding to a language of the input sentence 9 from the morphological analysis result 12 of the input sentence 9 while referring to the language-specific characteristic extraction rule 18 defined for the language and aimed at extracting a feature related to a representation or a part of speech included in the morphological analysis result 12 and outputting the feature as the language characteristic extraction result 15.

The named entity extraction device 10 according to the present embodiment includes the language characteristic extraction unit 14, the language characteristic extraction unit 14 selecting an abstract rule corresponding to a characteristic of a target language from among a collection of abstract rules common to a plurality of languages, setting, as the language-specific characteristic extraction rule 18, a concrete feature extraction method suited to the target language and a definition given as an output condition, defining, for each of a plurality of target languages, the language-specific characteristic extraction rule 18, extracting a feature corresponding to a language of the input sentence 9 from the morphological analysis result 12 of the input sentence 9 while referring to the language-specific characteristic extraction rule 18 defined for the language and aimed at extracting a feature related to a representation or a part of speech included in the morphological analysis result 12, outputting the feature as the language characteristic extraction result 15, the language-specific named entity extraction models 17, the named entity extraction models 17 using a machine learning algorithm common to the plurality of target languages, being learned in advance so as to receive the language characteristic extraction result 15 as an input and output a named entity extraction result, for each of the plurality of target languages, and the named entity extraction unit 16, the named entity extraction unit 16 receiving, as an input, the language characteristic extraction result 15 output from the language characteristic extraction unit 14, executing named entity extraction processing using the named entity extraction model 17 corresponding to the language of the input sentence 9, outputting an extracted named entity.

As described above, the named entity extraction device 10 according to the present embodiment can implement multi-language named entity extraction that handles a plurality of languages in a system common to languages as a processing system by expressing a difference in characteristics in the language-specific characteristic extraction rule 18 even if language characteristics to be focused on vary depending on a language.

Thus, the named entity extraction device 10 according to the present embodiment is capable of successfully absorbing a difference in characteristics to be taken into consideration between languages and implementing common named entity extraction in a processing system.

Note that the present embodiment is based on the assumption that which language is a language as a processing object is known in advance. Assume that an extraction rule in use and the named entity extraction model 17 in use are switched to ones for a language serving as a processing object so as to suit the target language. Use of a language identification technique in combination with the present disclosure also allows implementation of a system which automatically switches to a language extraction rule and the named entity extraction model 17 corresponding to a language identification result.

Note that it is obvious that the present embodiment is an example, a concrete configuration is not limited to the present embodiment, a design and the like within a range that does not depart from the spirit of the present invention are included, and that changes can be made in accordance with the situation.

For example, although the present embodiment has described a mode in which the named entity extraction device 10 includes the language-specific characteristic extraction rule 18, a part or the whole of the language-specific characteristic extraction rule 18 may be provided outside the named entity extraction device 10.

Although the present embodiment has described, as an example, named entity extraction, a technique according to the present disclosure is also applicable to tasks other than named entity extraction. The tasks are not limited as long as the tasks are each, for example, a task (e.g., extraction of a technical term or synonymity determination/sense disambiguation of a term) of extracting features focused on a representation or a part of speech of a word from a morphological analysis result and performing estimation and determination based on a machine learning model. The technique is applicable to any form.

The named entity extraction device 10 according to the present embodiment has a computer system inside. The computer system is assumed to include a website provision environment (or display environment) if a world wide web (WWW) system is used.

Although the present embodiment has described a mode in which the program is installed in advance, the program can be provided in a state of being stored in a computer-readable recording medium and can be provided over a network.

REFERENCE SIGNS LIST 9, 9A, 9B Input sentence
10 Named entity extraction device
11 Language characteristic extraction device
12 Morphological analysis unit
13, 13A, 13B Morphological analysis result
14 Language characteristic extraction unit
15, 15A, 15B Language characteristic extraction result
16 Named entity extraction unit
17 Named entity extraction model
18, 18A, 18B Language-specific characteristic extraction rule
19, 19A, 19B Named entity

The invention claimed is:

1. A computer-implemented method for processing a text, the method comprising:
receiving an input text, wherein the input text relates to a target language;
generating a morphological analysis result of the input text;
selecting, based on characteristics of the target language of the input text, a first rule from a set of abstract rules common across a plurality of languages, wherein the plurality of languages include the target language;
determining, based on the selected first rule, a second rule for the target language, wherein the second rule relates to a rule for a language-specific characteristic extraction, and wherein the rule for a language-specific characteristic extraction includes a method for a feature extraction and a condition for output specific to the target language;
determining, based on the second rule for the target language, a feature of the input text, wherein the second rule includes extracting a characteristic of a representation or a part of speech in the morphological analysis result; and
providing the feature of the input text as a result of extracting language characteristics of the input text.

2. The computer-implemented method of claim 1, the method further comprising:
generating the second rule for one of a plurality of target languages;
determining, based on a named entity extraction model for the target language of the input text and based on the determined result of extracting language characteristics, an named entity, wherein the named entity extraction model is a trained model including a machine language algorithm in common across the plurality of target languages; and
providing the determined named entity.

3. The computer-implemented method of claim 1, wherein the first rule includes one or more of:
a rule for capturing a characteristic of a character situation in a word,
a rule for replacing word information in a different perspective, and
a rule for implementing sifting-out a feature quantity for each of the plurality of target languages, and wherein the character situation relates to a status of a character of the word including a letter case and a type of character.

4. The computer-implemented method of claim 1, wherein the first rule includes one or more of:
a rule for extracting a partial character string at an arbitrary site,
a rule for extracting a character string by performing at least one of replacement, insertion, and deletion of a partial character string at an arbitrary site,
a rule for giving particular label information to an expression matching a predetermined pattern, and
a rule for determining whether an expression matches the predetermined pattern.

5. The computer-implemented method of claim 1, the method further comprising:
determining, based on the input text, the target language of the input text.

6. The computer-implemented method of claim 1, wherein the morphological analysis result of the input text includes a set of a word representation of one of words in the input text and one or more of: a part of speech, a base-form representation, and a reading of the one of words.

7. The computer-implemented method of claim 1, wherein the second rule includes providing the representation for matching in an external data source and receiving matched characteristic information of the word representation.

8. A system for processing a text, the system comprises:
a processor; and
a memory storing computer-executable instructions that when executed by the processor cause the system to:
receive an input text, wherein the input text relates to a target language;
generate a morphological analysis result of the input text;
select, based on characteristics of the target language of the input text, a first rule from a set of abstract rules common across a plurality of languages, wherein the plurality of languages include the target language;
determine, based on the selected first rule, a second rule for the target language, wherein the second rule relates to a rule for a language-specific characteristic extraction, and wherein the rule for a language-specific characteristic extraction includes a method for a feature extraction and a condition for output specific to the target language;
determine, based on the second rule for the target language, a feature of the input text, wherein the second rule includes extracting a characteristic of a representation or a part of speech in the morphological analysis result; and
provide the feature of the input text as a result of extracting language characteristics of the input text.

9. The system of claim 8, the computer-executable instructions when executed further causing the system to:
generate the second rule for one of a plurality of target languages;
determine, based on a named entity extraction model for the target language of the input text and based on the determined result of extracting language characteristics, an named entity, wherein the named entity extraction model is a trained model including a machine language algorithm in common across the plurality of target languages; and
provide the determined named entity.

10. The system of claim 8, wherein the first rule includes one or more of:
a rule for capturing a characteristic of a character situation in a word,
a rule for replacing word information in a different perspective, and
a rule for implementing sifting-out a feature quantity for each of the plurality of target languages, and wherein the character situation relates to a status of a character of the word including a letter case and a type of character.

11. The system of claim 8, wherein the first rule includes one or more of:
a rule for extracting a partial character string at an arbitrary site,
a rule for extracting a character string by performing at least one of replacement, insertion, and deletion of a partial character string at an arbitrary site,
a rule for giving particular label information to an expression matching a predetermined pattern, and
a rule for determining whether an expression matches the predetermined pattern.

12. The system of claim 8, the computer-executable instructions when executed further causing the system to:
determining, based on the input text, the target language of the input text.

13. The system of claim 8, wherein the morphological analysis result of the input text includes a set of a word representation of one of words in the input text and one or more of: a part of speech, a base-form representation, and a reading of the one of words.

14. The system of claim 8, wherein the second rule includes providing the representation for matching in an external data source and receiving matched characteristic information of the word representation.

15. A computer-readable non-transitory recording medium storing computer-executable instructions that when executed by a processor cause a computer system to:
receive a morphological analysis result of an input text;
select, based on characteristics of a target language of the input text, a first rule from a set of abstract rules common across a plurality of languages, wherein the first rule relates to an abstract rule;
determine, based on the selected first rule in combination with feature extraction methods and output conditions specific to the target language, a second rule, wherein the second rule relates to a rule for a language-specific characteristic extraction;
determine, based on the second rule for the target language, a feature of the input text, wherein the second rule relates to the target language of the input text, and wherein the second rule includes extracting a characteristic of a representation or a part of speech in the morphological analysis result; and
provide the feature of the input text as a result of extracting language characteristics.

16. The computer-readable non-transitory recording medium of claim 15, the computer-executable instructions when executed further causing the system to:
generate the second rule for one of a plurality of target languages;
determine, based on a named entity extraction model for the target language of the input text and based on the determined result of extracting language characteristics, an named entity, wherein the named entity extraction model is a trained model including a machine language algorithm in common across the plurality of target languages; and
provide the determined named entity.

17. The computer-readable non-transitory recording medium of claim 15, wherein the first rule includes one or more of:
a rule for capturing a characteristic of a character situation in a word,
a rule for replacing word information in a different perspective, and
a rule for implementing sifting-out a feature quantity for each of the plurality of target languages, and wherein the character situation relates to a status of a character of the word including a letter case and a type of character.

18. The computer-readable non-transitory recording medium of claim 15, wherein the first rule includes one or more of:
a rule for extracting a partial character string at an arbitrary site,
a rule for extracting a character string by performing at least one of replacement, insertion, and deletion of a partial character string at an arbitrary site,
a rule for giving particular label information to an expression matching a predetermined pattern, and
a rule for determining whether an expression matches the predetermined pattern.

19. The computer-readable non-transitory recording medium of claim 15, wherein the morphological analysis result of the input text includes a set of a word representation of one of words in the input text and one or more of: a part of speech, a base-form representation, and a reading of the one of words.

20. The computer-readable non-transitory recording medium of claim 15, wherein the second rule includes providing the representation for matching in an external data source and receiving matched characteristic information of the word representation.

* * * * *